US012571719B2

(12) United States Patent
Asada et al.

(10) Patent No.: US 12,571,719 B2
(45) Date of Patent: Mar. 10, 2026

(54) CORROSION-RESISTANCE TESTING METHOD FOR COATED METAL MEMBER, CORROSION-RESISTANCE TESTING APPARATUS FOR COATED METAL MEMBER, CORROSION-RESISTANCE TESTING PROGRAM FOR COATED METAL MEMBER, AND STORAGE MEDIUM

(71) Applicant: MAZDA MOTOR CORPORATION, Hiroshima (JP)

(72) Inventors: Teruaki Asada, Aki-gun (JP); Katsunobu Sasaki, Aki-gun (JP); Tatsuya Ezaki, Aki-gun (JP); Tsutomu Shigenaga, Aki-gun (JP); Akihide Takami, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 508 days.

(21) Appl. No.: 17/932,266

(22) Filed: Sep. 14, 2022

(65) Prior Publication Data

US 2023/0108474 A1     Apr. 6, 2023

(30) Foreign Application Priority Data

Oct. 1, 2021     (JP) ................................. 2021-163043

(51) Int. Cl.
*G01N 17/02*          (2006.01)
(52) U.S. Cl.
CPC .................................... *G01N 17/02* (2013.01)
(58) Field of Classification Search
CPC .................................................. G01N 17/02
See application file for complete search history.

(56) References Cited

U.S. PATENT DOCUMENTS 6,805,788 B1 * 10/2004 Gonzalez-Martin ... G01N 17/02
205/775.5
2018/0292464 A1 * 10/2018 Shinozaki ............ G01R 31/392
(Continued)

FOREIGN PATENT DOCUMENTS

JP          S61-54437 A        3/1986
JP          2000-258381 A      9/2000
(Continued)

OTHER PUBLICATIONS

Asada et al., JP2019032173A, English translation, 2019 (Year: 2019).*
(Continued)

*Primary Examiner* — Shizhi Qian
(74) *Attorney, Agent, or Firm* — Studebaker Brackett PLLC

(57) ABSTRACT

A corrosion-resistance testing method for a coated metal member formed of a metallic substrate provided with a surface treatment coating includes an electrification step for applying a voltage and/or a current between a surface of the surface treatment coating and the metallic substrate while a corrosion factor is in contact with the surface of the surface treatment coating so as to measure a temporal change in a current and/or a voltage occurring between the surface of the surface treatment coating and the metallic substrate, and an evaluation step for evaluating a coating quality of the surface treatment coating based on at least one of a gradient of the temporal change when a value of the current and/or the voltage exceeds a predetermined value, an integrated value of the value of the current and/or the voltage within a predetermined time range, and a time average value of the integrated value.

10 Claims, 9 Drawing Sheets

(56)  References Cited

U.S. PATENT DOCUMENTS

| | | | | |
|---|---|---|---|---|
| 2018/0304305 A1* | 10/2018 | Yamane | ................. | B32B 27/20 |
| 2020/0333486 A1* | 10/2020 | Kondo | .................... | G01V 3/04 |

FOREIGN PATENT DOCUMENTS

| | | | | |
|---|---|---|---|---|
| JP | 2007-271501 A | | 10/2007 |
| JP | 2016050915 A | * | 4/2016 |
| JP | 2016-095146 A | | 5/2016 |
| JP | 2017-181486 A | | 10/2017 |
| JP | 2019032173 A | * | 2/2019 |

OTHER PUBLICATIONS

Yew A.C., Numerical differention: finite difference, APMA 0160, Spring 2011, https://www.dam.brown.edu/people/alcyew/handouts/numdiff.pdf (Year: 2011).*
Isomoto et al. JP2016050915A, English translation, 2016 (Year: 2016).*

* cited by examiner

FIG.1

DETECTED CURRENT VALUE / A

APPLIED VOLTAGE VALUE / V

TIME / SECONDS

FIG.8

| TEST EXAMPLE | | 1 | 2 |
|---|---|---|---|
| COATING QUALITY OR COATING-QUALITY DETERIORATION FACTOR | | NORMAL COATING | LOW CROSS-LINK (INSUFFICIENT BAKING) |
| COATING SPECIFICATIONS | ELECTRODEPOSITION BAKING | 160°C × 10 MINUTES | 140°C × 15 MINUTES |
| | COATING THICKNESS (μm) | 10 | 10 |
| RISING GRADIENT (mA/s) | | 14.2 | 2.44 |
| INTEGRATED ELECTRICAL QUANTITY (mC) | | 17.3 | 23.8 |
| AVERAGE CURRENT VALUE PER UNIT TIME (mA) | | 0.070 | 0.305 |
| WAVEFORM OF TEMPORAL CHANGE DATA | | | |
| DIGITAL MICROSCOPIC PHOTOGRAPH | | | |

FIG.9

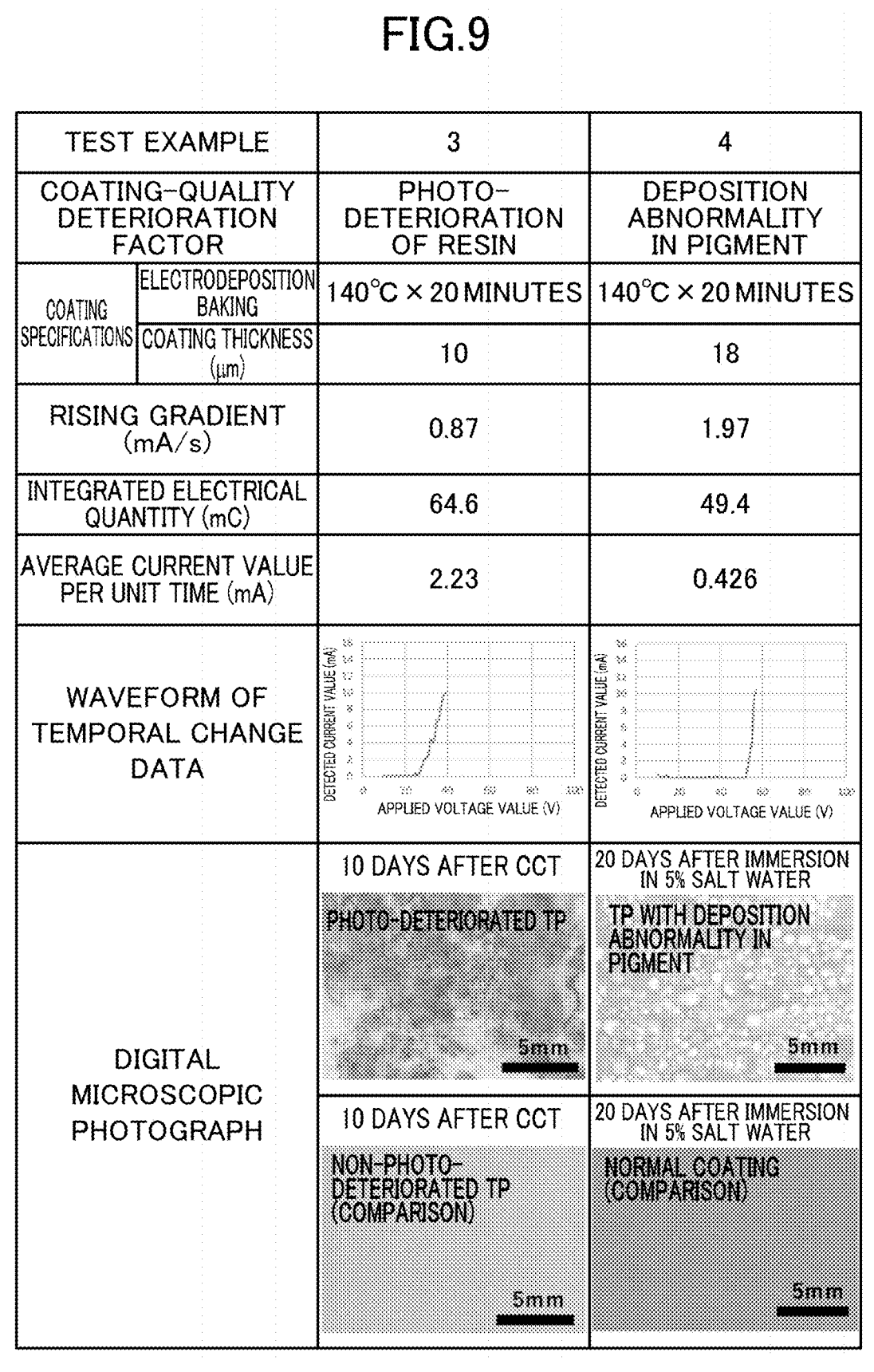

| TEST EXAMPLE | | 3 | 4 |
|---|---|---|---|
| COATING-QUALITY DETERIORATION FACTOR | | PHOTO-DETERIORATION OF RESIN | DEPOSITION ABNORMALITY IN PIGMENT |
| COATING SPECIFICATIONS | ELECTRODEPOSITION BAKING | 140°C × 20 MINUTES | 140°C × 20 MINUTES |
| | COATING THICKNESS (μm) | 10 | 18 |
| RISING GRADIENT (mA/s) | | 0.87 | 1.97 |
| INTEGRATED ELECTRICAL QUANTITY (mC) | | 64.6 | 49.4 |
| AVERAGE CURRENT VALUE PER UNIT TIME (mA) | | 2.23 | 0.426 |
| WAVEFORM OF TEMPORAL CHANGE DATA | | | |
| DIGITAL MICROSCOPIC PHOTOGRAPH | | 10 DAYS AFTER CCT<br>PHOTO-DETERIORATED TP 5mm | 20 DAYS AFTER IMMERSION IN 5% SALT WATER<br>TP WITH DEPOSITION ABNORMALITY IN PIGMENT 5mm |
| | | 10 DAYS AFTER CCT<br>NON-PHOTO-DETERIORATED TP (COMPARISON) 5mm | 20 DAYS AFTER IMMERSION IN 5% SALT WATER<br>NORMAL COATING (COMPARISON) 5mm |

1

CORROSION-RESISTANCE TESTING METHOD FOR COATED METAL MEMBER, CORROSION-RESISTANCE TESTING APPARATUS FOR COATED METAL MEMBER, CORROSION-RESISTANCE TESTING PROGRAM FOR COATED METAL MEMBER, AND STORAGE MEDIUM

CROSS REFERENCES TO RELATED APPLICATIONS

The present disclosure contains subject matter related to Japanese Patent Application No. 2021-163043 filed in the Japan Patent Office on Oct. 1, 2021, the entire contents of which are incorporated herein by reference.

BACKGROUND OF THE INVENTION

1. Field of the Invention

The present disclosure relates to corrosion-resistance testing methods for coated metal members, corrosion-resistance testing apparatuses for coated metal members, corrosion-resistance testing programs for coated metal members, and storage media.

2. Description of the Related Art

In the related art, accelerated corrosion tests, such as combined cycle tests and salt-spray tests, have been performed for evaluating coating performance.

However, since such an accelerated corrosion test requires several months for an evaluation, it is difficult to simply evaluate the state of a coating with different components and different baking conditions of, for example, a coated steel plate and to quickly optimize the coating conditions. Therefore, in material development sites, process management sites of coating factories, and quality management sites related to automotive corrosion prevention, there are demands for establishing a quantitative evaluation method for quickly and easily evaluating the corrosion resistance of coated steel plates.

Japanese Unexamined Patent Application Publication No. 61-54437 describes a method for predicting the lifespan of coated metal. This method involves applying a direct-current voltage between the coated metal and a counter electrode that are set in a practical or test environment, measuring the current flowing during this voltage application to preliminarily calculate a temporal change in the current, and subsequently performing extrapolation up to a current value corresponding to an arbitrary opening area of a coating so as to determine a time period during this time as the lifespan.

Japanese Unexamined Patent Application Publication No. 2007-271501 describes a method for evaluating the corrosion resistance of a coating formed over the surface of a metallic member. This method involves immersing the metallic member and a counter electrode member in water or an electrolytic solution, electrically connecting a negative terminal and a positive terminal of a measurement power supply to the metallic member and the counter electrode member, respectively, and evaluating the anti-corrosion performance of a coating based on an oxygen diffusion limitation current flowing through the metallic member from the counter electrode member via the coating.

In Japanese Unexamined Patent Application Publication No. 2016-50915, an electrode is disposed at the coating surface side of a coated metal member with an electrolyte material interposed therebetween, a voltage is applied between a substrate of the coated metal member and the coating surface, and the corrosion resistance of the coated metal member is evaluated based on a voltage value when the coating electrically breaks down.

Japanese Unexamined Patent Application Publication No. 2000-258381 describes a corrosion-rate measuring method in a thermal-power-plant water supply system. The method involves forming an electrode pair with a sample electrode composed of the same material as a structural material of the thermal-power-plant water supply system and a counter electrode composed of a noble metal, disposing the electrode pair within the thermal-power-plant water supply system to measure a current value occurring between the electrodes of the electrode pair, and using a correlation between an average corrosion rate of the structural material in an environment to which the electrode pair is exposed and an average value of a current density occurring between the electrodes at that time to determine the corrosion rate of the structural material from the measured current value in real time.

SUMMARY OF THE INVENTION

In the techniques described in the above documents, the lifespan of a coating can be predicted, and the overall corrosion resistance of the coating can be evaluated. However, there is room for improvement from the standpoint of evaluating the state of the coating in more detail.

The present disclosure provides a corrosion-resistance testing method for a coated metal member, a corrosion-resistance testing apparatus for a coated metal member, a corrosion-resistance testing program for a coated metal member, and a storage medium storing the program by which the state of a surface treatment coating can be evaluated accurately and readily in more detail.

In order to solve the aforementioned problems, an embodiment of the present disclosure provides a corrosion-resistance testing method for a coated metal member formed of a metallic substrate provided with a surface treatment coating. The corrosion-resistance testing method for the coated metal member includes an electrification step for applying a voltage and/or a current between a surface of the surface treatment coating and the metallic substrate in a state where a corrosion factor is in contact with the surface of the surface treatment coating so as to measure a temporal change in a current and/or a voltage occurring between the surface of the surface treatment coating and the metallic substrate, and an evaluation step for evaluating a coating quality of the surface treatment coating based on at least one of a gradient of the temporal change when a value of the current and/or the voltage exceeds a predetermined value, an integrated value of the value of the current and/or the voltage within a predetermined time range, and a time average value of the integrated value.

Normally, a coated metal member provided with a surface treatment coating starts to corrode when a corrosion factor, such as salt water or electrolyte-containing mud, penetrates the surface treatment coating and reaches the metallic substrate. Specifically, the corrosion process of the coated metal member is divided into a process up to the occurrence of corrosion and a process during which the corrosion progresses. An evaluation can be performed by determining the period (i.e., corrosion suppression period) until the corrosion starts and the rate at which the corrosion progresses (i.e., corrosion progression rate).

For example, Japanese Unexamined Patent Application Publication No. 2016-50915 involves bringing the corrosion factor into contact with the surface of the surface treatment coating, applying a voltage between the surface of the surface treatment coating and the metallic substrate, and evaluating the aforementioned corrosion suppression period for the corrosion resistance of the coated metal member based on a voltage value when the coating electrically breaks down. In detail, in a case where the overall coating quality of the surface treatment coating is normal, an electric current hardly flows between the surface of the surface treatment coating and the metallic substrate when a voltage that gradually increases relative to time is applied. However, the current value increases rapidly when the voltage exceeds a certain voltage value. This rapid increase in the detected current value indicates that the penetration of the corrosion factor into the surface treatment coating is accelerated in accordance with the voltage application and that the corrosion factor has reached the surface of the metallic substrate. Specifically, assuming that the applied voltage value when the detected current value reaches a predetermined threshold value is defined as an insulation voltage, the time until the insulation voltage is reached corresponds to a period up until the corrosion factor reaches the steel plate, that is, the corrosion suppression period of the coated metal member.

However, if the overall coating quality of the surface treatment coating is not normal, it is predicted that the waveform of a temporal change in the detected current value and/or the detected voltage value varies from the waveform described above. In detail, if the overall coating quality of the surface treatment coating is not normal, it is conceivable that the penetration of the corrosion factor into the surface treatment coating is accelerated uniformly over a wide range, and that conduction occurs gradually from where the corrosion factor has reached the metallic substrate. Thus, it is conceivable that the gradient along which the detected current value and/or the detected voltage value increase/increases becomes a gentle gradient instead of a steep gradient. Furthermore, since the detected current value and/or the detected voltage value increase/increases gradually, it is conceivable that the amount of current and/or voltage occurring within the predetermined time range becomes larger than that in a normal coating. Specifically, since the waveform of the temporal change has a shape that reflects the overall coating quality of the surface treatment coating, the overall coating quality of the surface treatment coating can be evaluated readily and accurately based on at least one of the aforementioned evaluation parameters that can be calculated from the waveform. Although the coating quality is normally evaluated based on the coating thickness and the corrosion suppression period, this configuration enables an easy and accurate evaluation of the coating quality even for a test piece whose coating thickness is difficult to measure. Thus, the reliability of the corrosion resistance test is enhanced. Furthermore, with the present disclosure, corrosion-resistance-related information about the surface treatment coating of the coated metal member can quantitatively serve as digital data.

In this description, the term "temporal change (data)" may refer to data in which a detected current value and/or a detected voltage value are/is plotted out relative to time. If a gradually-increasing voltage and/or current are/is to be applied, the term "temporal change (data)" may refer to data in which a detected current value and/or a detected voltage value are/is plotted out relative to the applied voltage value and/or the applied current value.

The electrification step may include applying the voltage and/or the current gradually increasing relative to time or gradually increasing proportionally relative to time.

With the applied voltage and/or current gradually increasing relative to time, preferably, gradually increasing proportionally relative to time, the coating quality of the surface treatment coating can be evaluated accurately within a shorter period of time.

The evaluation step may include evaluating the coating quality of the surface treatment coating based on at least the time average value.

According to this configuration, the coating quality of the surface treatment coating can be evaluated more accurately, and the reliability of the corrosion resistance test is enhanced.

The evaluation step may include determining that the coating quality is not normal when the time average value exceeds a predetermined threshold value.

As mentioned above, if the coating quality is not normal, the detected current value and/or the detected voltage value gradually increase/increases. Therefore, it is conceivable that the time average value in the temporal change becomes larger than in a case where the coating quality is normal. Thus, if the time average value exceeds the predetermined threshold value, it can be determined that the coating quality is not normal. According to this configuration, an abnormality in the coating quality can be detected readily and accurately.

The metallic substrate may include a chemical conversion coating formed on a surface of the metallic substrate, and the surface treatment coating may be provided on the surface of the metallic substrate with the chemical conversion coating interposed therebetween.

The metallic substrate may be a steel plate for an automotive component.

The surface treatment coating may be an electrodeposition coating formed by using a resin-based coating material.

The evaluation step may include evaluating the coating quality of the surface treatment coating based on the gradient.

The electrification step may include applying the voltage between the surface of the surface treatment coating and the metallic substrate so as to measure the temporal change in the current occurring between the surface of the surface treatment coating and the metallic substrate, and the gradient may be expressed as a rate of increase obtained as a result of dividing an increment of the value of the current from a measurement point immediately after the value of the current exceeds the predetermined value to a measurement point immediately before a value of the applied voltage or a detected value of the current reaches a threshold value set as an upper limit value of measurement by an increment of time.

The predetermined value may range between 0.1 mA and 1 mA inclusive.

An embodiment of the present disclosure provides a corrosion-resistance testing apparatus for a coated metal member formed of a metallic substrate provided with a surface treatment coating. The corrosion-resistance testing apparatus for the coated metal member includes: an electrode disposed at the surface treatment coating side of the coated metal member; a power supply configured to apply a voltage and/or a current between the electrode and the metallic substrate in a state where a corrosion factor is disposed between the surface treatment coating and the electrode and in contact with the surface treatment coating and the electrode; a detector configured to detect a current and/or a voltage occurring between the electrode and the metallic substrate in accordance with the voltage and/or the current applied by the power supply; and an evaluator configured to evaluate a coating quality of the surface treatment coating based on at least one of a gradient of a temporal change in the current and/or the voltage detected by the detector when a value of the current and/or the voltage exceeds a predetermined value, an integrated value of the value of the current and/or the voltage within a predetermined time range, and a time average value of the integrated value.

According to this configuration, since the waveform of the temporal change has a shape that reflects the overall coating quality of the surface treatment coating, the overall coating quality of the surface treatment coating can be evaluated readily and accurately based on at least one of the aforementioned evaluation parameters that can be calculated from the waveform. Although the coating quality is normally evaluated based on the coating thickness and the corrosion suppression period, this configuration enables an easy and accurate evaluation of the coating quality even for a test piece whose coating thickness is difficult to measure. Thus, the reliability of the corrosion resistance test is enhanced. Furthermore, with the present disclosure, corrosion-resistance-related information about the surface treatment coating of the coated metal member can quantitatively serve as digital data.

The evaluator may be configured to evaluate the coating quality of the surface treatment coating based on at least the time average value.

According to this configuration, the coating quality of the surface treatment coating can be evaluated more accurately, and the reliability of the corrosion resistance test is enhanced.

The evaluator may be configured to determine that the coating quality is not normal when the time average value exceeds a predetermined threshold value.

As mentioned above, if the coating quality is not normal, the detected current value and/or the detected voltage value gradually increase/increases. Therefore, it is conceivable that the time average value in the temporal change becomes larger than in a case where the coating quality is normal. Thus, if the time average value exceeds the predetermined threshold value, it can be determined that the coating quality is not normal. According to this configuration, an abnormality in the coating quality can be detected readily and accurately.

The power supply may be configured to apply the voltage and/or the current gradually increasing relative to time or gradually increasing proportionally relative to time.

With the applied voltage and/or current gradually increasing relative to time, preferably, gradually increasing proportionally relative to time, the coating quality of the surface treatment coating can be evaluated accurately within a shorter period of time.

The evaluator may be configured to evaluate the coating quality of the surface treatment coating based on the gradient.

The power supply may be configured to apply the voltage between the electrode and the metallic substrate, the detector may be configured to detect the current occurring between the electrode and the metallic substrate, and the gradient may be expressed as a rate of increase obtained as a result of dividing an increment of the value of the current from a measurement point immediately after the value of the current exceeds the predetermined value to a measurement point immediately before a value of the applied voltage or a detected value of the current reaches a threshold value set as an upper limit value of measurement by an increment of time.

The predetermined value may range between 0.1 mA and 1 mA inclusive.

At least the above-described evaluation step is programmed as a corrosion-resistance testing program. Specifically, an embodiment of the present disclosure provides a corrosion-resistance testing program for a coated metal member formed of a metallic substrate provided with a surface treatment coating. The corrosion-resistance testing program causes a computer to execute a process including evaluating a coating quality of the surface treatment coating based on at least one of a gradient of a temporal change in a current and/or a voltage when a value of the current and/or the voltage exceeds a predetermined value, an integrated value of the value of the current and/or the voltage within a predetermined time range, and a time average value of the integrated value. The current and/or the voltage occur/occurs between a surface of the surface treatment coating and the metallic substrate as a result of applying a voltage and/or a current between the surface of the surface treatment coating and the metallic substrate in a state where a corrosion factor is in contact with the surface of the surface treatment coating.

The process executed by the computer may include evaluating the coating quality of the surface treatment coating based on the gradient.

An embodiment of the present disclosure provides a computer-readable storage medium storing the aforementioned corrosion-resistance testing program for the coated metal member.

As mentioned above, according to the present disclosure, the overall coating quality of the surface treatment coating can be evaluated readily and accurately. Moreover, the coating quality can be evaluated readily and accurately even for a test piece whose coating thickness is difficult to measure. Thus, the reliability of the corrosion resistance test is enhanced. Furthermore, with the present disclosure, corrosion-resistance-related information about the surface treatment coating of the coated metal member can quantitatively serve as digital data.

BRIEF DESCRIPTION OF THE DRAWINGS

FIG. 1 illustrates an example of a corrosion-resistance testing apparatus for a coated metal member according to a first embodiment;

FIG. 8 is a chart illustrating results of corrosion resistance tests according to test examples;

FIG. 9 is a chart illustrating results of corrosion resistance tests according to test examples;

DESCRIPTION OF THE PREFERRED EMBODIMENTS

Figure 2:
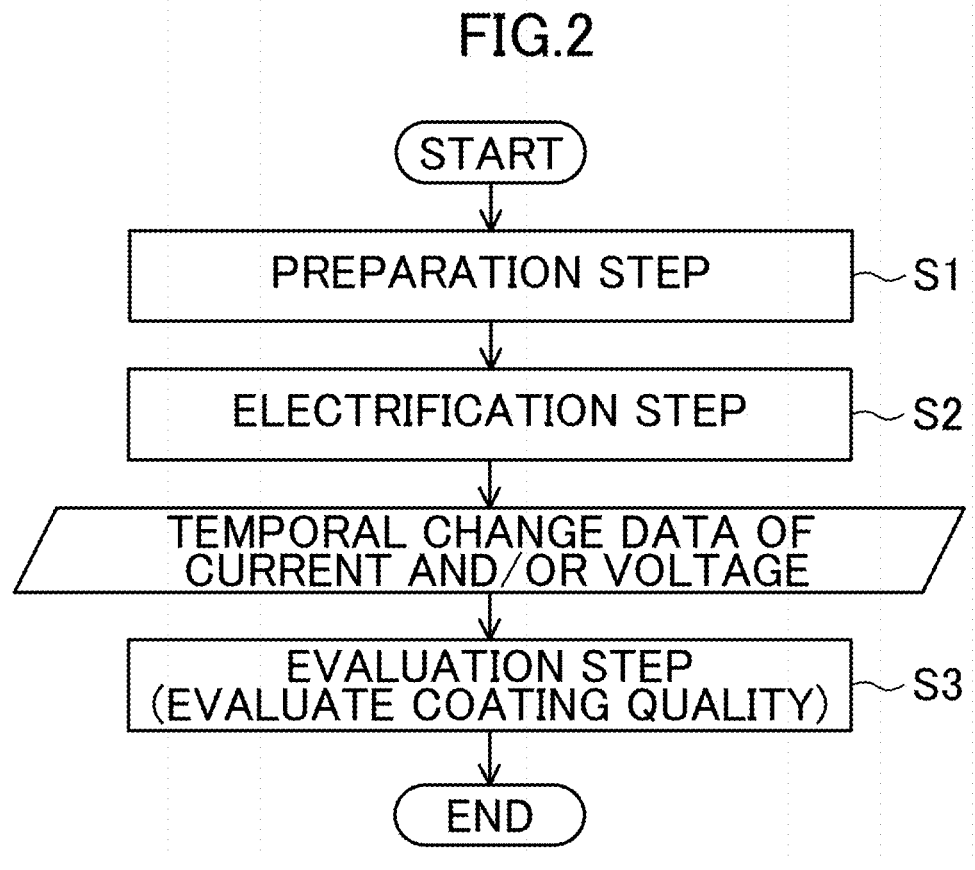
FIG. 2 is a flowchart illustrating a process of a corrosion-resistance testing method according to the first embodiment.

Embodiments of the present disclosure will be described in detail below with reference to the drawings. The description of the following preferred embodiments is substantially exemplary and is not intended whatsoever to limit the present disclosure, the application thereof, or the purpose thereof.

First Embodiment

Coated Metal Member

A coated metal member 1 as an object to be tested in a corrosion resistance test according to a first embodiment is formed of a metallic substrate provided with a surface treatment coating.

The metallic substrate is, for example, a steel member constituting a household electrical appliance, a construction material, or an automotive component. For example, the metallic substrate may be a steel plate cold (SPC), an alloyed hot dip galvanized steel sheet (GA), a high-tensile steel plate, or a hot-stamped material, or may be a light-alloy material. The metallic substrate is preferably a steel plate for an automotive component. The metallic substrate may have a chemical conversion coating (such as a phosphate coating (e.g., a zinc phosphate coating) or a chromate coating) on the surface thereof.

The surface treatment coating is formed by using a resin-based coating material. In other words, the surface treatment coating is preferably a resin coating, and is more preferably an electrodeposition coating. A specific example of the resin coating is an epoxy-resin-based or acrylic-resin-based cationic electrodeposition coating (i.e., an undercoating).

The coated metal member may include a multilayer coating having two or more layers as the surface treatment coating. In detail, for example, if the surface treatment coating is a resin coating, the surface treatment coating may be a multilayer coating formed by stacking an overcoating over an electrodeposition coating, or may be a multilayer coating formed by stacking an intermediate coating and an overcoating over an electrodeposition coating.

The intermediate coating has a role of ensuring the finished quality and the anti-chipping properties of the coated metal member, as well as enhancing the adhesiveness between the electrodeposition coating and the overcoating. The overcoating ensures the color of the coated metal member, the finished quality thereof, and the weather resistant properties thereof. In detail, for example, these coatings may be composed of a coating material constituted of base resin, such as polyester resin, acrylic resin, or alkyd resin, and a crosslinking agent, such as melamine resin, urea resin or a polyisocyanate compound (including a blocked type).

The following description relates to an example of the coated metal member 1 in which a metallic substrate having a chemical conversion coating 3 formed over the surface of a steel plate 2 is provided with an electrodeposition coating 4 (i.e., a resin coating) serving as a surface treatment coating.

Corrosion Factor

A corrosion factor 6 is an electrolyte material at least containing water and a supporting electrolyte, and functions as a conductive material. In the market, salt water or mud containing an electrolyte component may act as a corrosion factor. When the corrosion factor 6 simulating such a material acting as a corrosion factor is brought into contact with the surface of the electrodeposition coating 4 to apply a voltage and/or a current in an electrification step S2 to be described later, the penetration of the corrosion factor 6 into the electrodeposition coating 4 is accelerated, so that the time required for a corrosion resistance test can be shortened. The corrosion factor 6 may be a mud-like object further containing a clay mineral. With the corrosion factor 6 containing a clay mineral, ions and water in the corrosion factor 6 can readily penetrate the electrodeposition coating 4 in the electrification step S2 to be described later.

The supporting electrolyte is salt and is provided for adding sufficient conductivity to the corrosion factor 6. In detail, for example, the supporting electrolyte used may be at least one salt selected from sodium chloride, sodium sulfate, calcium chloride, calcium phosphate, potassium chloride, potassium nitrate, potassium hydrogen tartrate, and magnesium sulfate. In particular, the supporting electrolyte used may preferably be at least one salt selected from sodium chloride, sodium sulfate, and calcium chloride. The amount of supporting electrolyte contained in the corrosion factor 6 is preferably between 1% by mass and 20% by mass inclusive, more preferably between 3% by mass and 15% by mass inclusive, and even more preferably between 5% by mass and 10% by mass inclusive.

The clay mineral turns the corrosion factor 6 into a mud-like object and is provided for accelerating the movement of ions and the penetration of water into the electrodeposition coating 4. An example of the clay mineral used may be a layered silicate mineral or zeolite. An example of the layered silicate mineral used may be at least one selected from kaolinite, montmorillonite, sericite, illite, glauconite, chlorite, and talc, and may preferably be kaolinite. The amount of clay mineral contained in the corrosion factor is preferably between 1% by mass and 70% by mass inclusive, more preferably between 10% by mass and 50% by mass inclusive, and even more preferably between 20% by mass and 30% by mass inclusive. With the corrosion factor 6 being a mud-like object, the corrosion factor 6 can be provided on the surface of the electrodeposition coating 4 even in a case where the electrodeposition coating 4 is not horizontal.

The corrosion factor 6 may further contain an additive other than the water, the supporting electrolyte, and the clay mineral. Specific examples of such an additive include an organic solvent, such as acetone, ethanol, toluene, or methanol, and a material that enhances coating wettability. Such an organic solvent and/or material may also have the function for accelerating the penetration of water into the electrodeposition coating 4. Such an organic solvent and/or material may be added to the corrosion factor 6 in place of the clay mineral. In a case where the corrosion factor 6 contains an organic solvent, the amount of organic solvent contained in the corrosion factor 6 preferably ranges between 5% and 60% in terms of the volume ratio relative to water. This volume ratio preferably ranges between 10% and 40% inclusive, and more preferably ranges between 20% and 30% inclusive.

Corrosion-Resistance Testing Apparatus for Coated Metal Member

Figure 1:
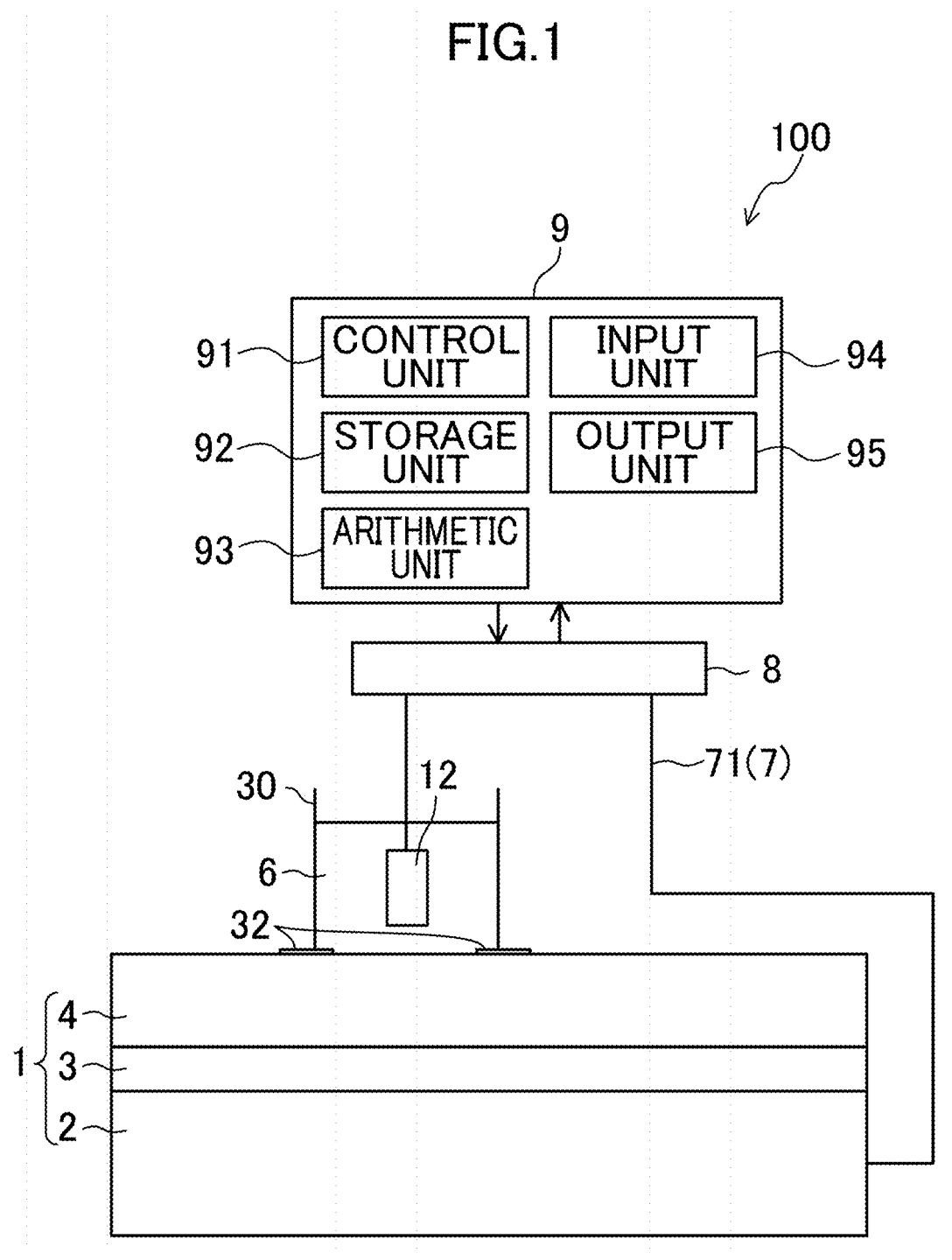

FIG. 1 illustrates an example of a corrosion-resistance testing apparatus 100 for a coated metal member according to this embodiment.

As shown in FIG. 1, the corrosion-resistance testing apparatus 100 according to this embodiment includes a container 30, an electrode 12, an external circuit 7, an electrifier 8 (power supply, detector), and a controller 9 (evaluator).

Container

The container 30 is placed on the electrodeposition coating 4 of the coated metal member 1 with an anti-leakage sealing member 32 interposed therebetween. The corrosion factor 6 is in contact with the surface of the electrodeposition coating 4 in a state where the corrosion factor 6 is contained in the container 30.

The container 30 is not particularly limited in shape and may have, for example, a cylindrical shape, such as a circular cylindrical shape or a polygonal cylindrical shape. The container 30 may be composed of a resin material, such as acrylic resin, epoxy resin, or aromatic polyether ether ketone (PEEK), or a ceramic material. In particular, the container 30 may preferably be composed of a resin material, such as acrylic resin, epoxy resin, or aromatic polyether ether ketone (PEEK). Accordingly, the corrosion-resistance testing apparatus 100 can be reduced in weight and cost while insulation properties between the container 30 and the outside can be ensured.

The sealing member 32 is, for example, a sheet-like sealing member composed of silicone resin. When the container 30 is placed on the coated metal member 1, the sealing member 32 can enhance the adhesiveness between the container 30 and the electrodeposition coating 4 and can also fill in the gap therebetween. Accordingly, leakage of the corrosion factor 6 from between the container 30 and the electrodeposition coating 4 can be effectively suppressed. Although a configuration not provided with the sealing member 32 is also possible, the sealing member 32 is preferably provided from the standpoint of sufficiently suppressing leakage of the corrosion factor 6.

Electrode

The electrode 12 is used for applying a voltage between the steel plate 2 and the surface of the electrodeposition coating 4, and is disposed at the electrodeposition coating 4 side of the coated metal member 1. The corrosion factor 6 is disposed between the electrodeposition coating 4 and the electrode 12 so as to be in contact with the electrodeposition coating 4 and the electrode 12. In detail, the electrode 12 is provided such that at least an end thereof is embedded in the corrosion factor 6, and is in contact with the corrosion factor 6.

The electrode 12 may be an electrode normally used in electrochemical measurement. In detail, for example, a carbon electrode or a platinum electrode may be used as the electrode 12.

The electrode 12 may have a shape, such as a rod shape or a tabular shape, normally used in electrochemical measurement. Furthermore, for example, the electrode 12 used may be a perforated electrode having at least one hole at an end thereof. For example, if a perforated electrode having a ring-shaped end is to be used, the perforated electrode may be disposed such that the ring is substantially parallel to the electrodeposition coating 4. Alternatively, a meshed electrode may be used as the perforated electrode, and may be disposed substantially parallel to the electrodeposition coating 4 while being embedded in the corrosion factor 6.

External Circuit

The external circuit 7 includes a wire 71 and the electrifier 8 disposed on the wire 71. The wire 71 is electrically connected to the electrode 12 and the steel plate 2. A commonly known wire may be appropriately used as the wire 71.

Electrifier

The electrifier 8 is connected to the electrode 12 and the steel plate 2 by the wire 71 and has a role of a power supply that applies a voltage and/or a current between the electrode 12 and the steel plate 2. At the same time, the electrifier 8 also has a role of a current/voltage detector (detector) that detects a current and/or a voltage flowing between the electrode 12 and the steel plate 2 as a result of the application of the voltage and/or the current. A specific example of the electrifier 8 used may be a potentiostat/galvanostat controllable as a method of voltage/current application.

The electrifier 8 is electrically connected or wirelessly connected to the controller 9, to be described later, and is controlled by the controller 9. A voltage value and/or a current value (also referred to as "an applied voltage value and/or an applied current value") actually applied by the electrifier 8, a current value and/or a voltage value (also referred to as "a detected current value and/or a detected voltage value") detected by the electrifier 8, and electrification information, such as the electrification time, are transmitted to the controller 9.

It is desirable that the electrifier 8 applies, between the electrode 12 and the steel plate 2, a voltage and/or a current gradually increasing relative to time, preferably, a voltage and/or a current gradually increasing proportionally relative to time. Accordingly, the coating quality of the electrodeposition coating 4 can be evaluated accurately within a shorter period of time.

Controller

The controller 9 is, for example, a known microcomputer-based device and includes a control unit 91, a storage unit 92, and an arithmetic unit 93. Furthermore, the controller 9 includes an input unit 94 formed of, for example, a keyboard, and an output unit 95 formed of, for example, a display. The storage unit 92 stores information, such as various types of data and an arithmetic processing program. The arithmetic unit 93 performs various types of arithmetic processing based on, for example, the aforementioned information stored in the storage unit 92 and information input via the input unit 94. Based on, for example, the data stored in the storage unit 92 and the arithmetic result obtained by the arithmetic unit 93, the control unit 91 outputs a control signal to the electrifier 8 and controls the voltage and/or the current to be applied to the external circuit 7 by the electrifier 8.

Although details will be described later, the controller 9 functions as an evaluator that evaluates the coating quality of the electrodeposition coating 4 based on at least one of a gradient of a temporal change in the detected current value and/or the detected voltage value when the detected current value and/or the detected voltage value exceed/exceeds a predetermined value, an integrated value of the detected current value and/or the detected voltage value within a predetermined time range, and a time average value of the integrated value. In particular, the controller 9 preferably evaluates the coating quality of the surface treatment coating based on the time average value. Furthermore, the controller 9 preferably determines that the coating quality is not normal when the time average value exceeds a predetermined threshold value.

Corrosion-Resistance Testing Method for Coated Metal Member

Figure 3:
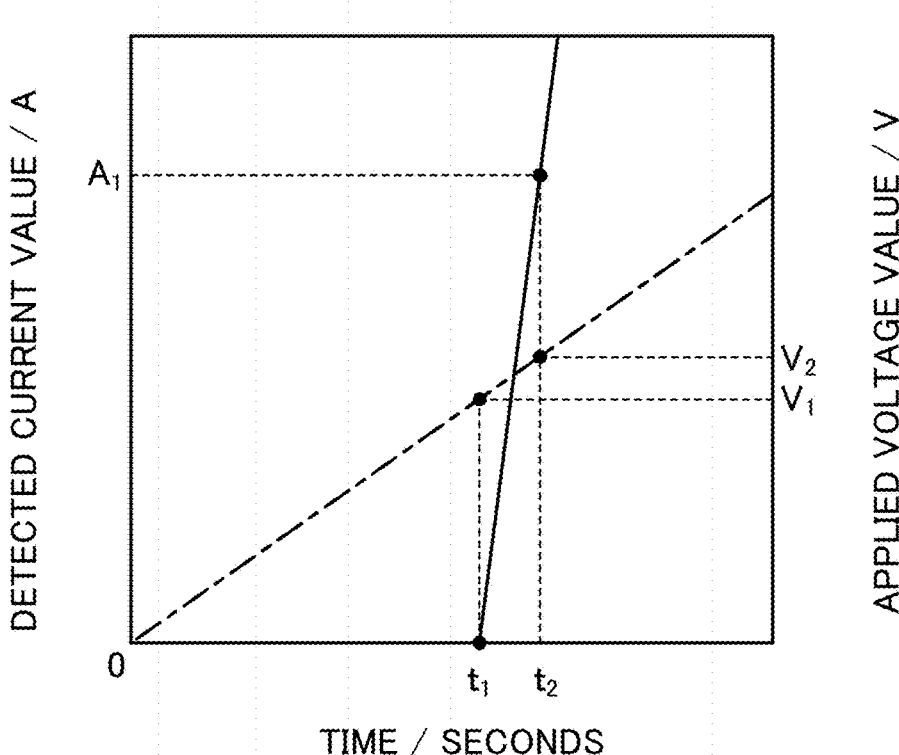
FIG. 3 illustrates an example of a change in an applied voltage (single-dotted chain line) and a change in a current (solid line) flowing between an electrode and a steel plate in accordance with voltage application when a corrosion resistance test is performed on a coated metal member having a normal electrodeposition coating.
Figure 4:
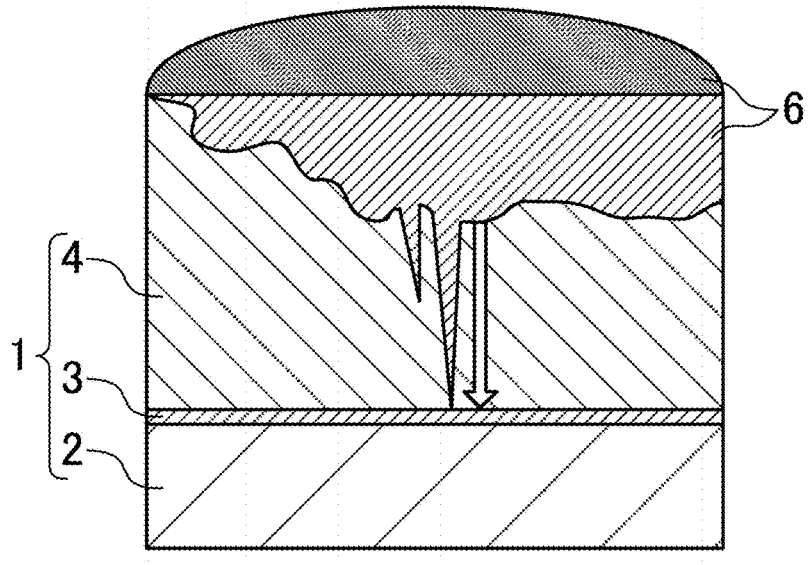
FIG. 4 is a diagram for explaining an example of a conduction mechanism in the coated metal member having the normal electrodeposition coating.
Figure 5:
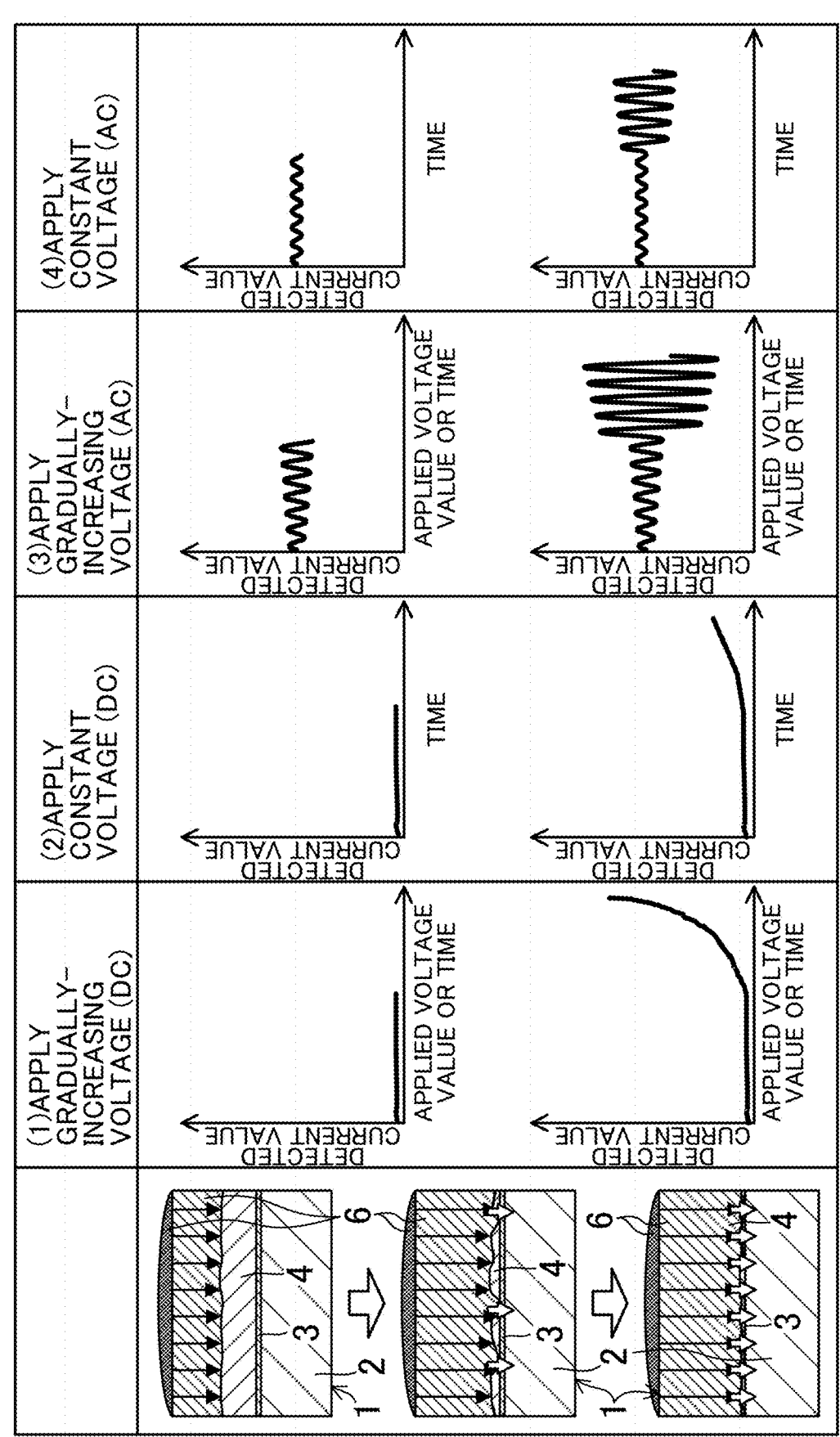
FIG. 5 is a diagram for explaining the concept of the corrosion-resistance testing method according to the first embodiment.
Figure 6:
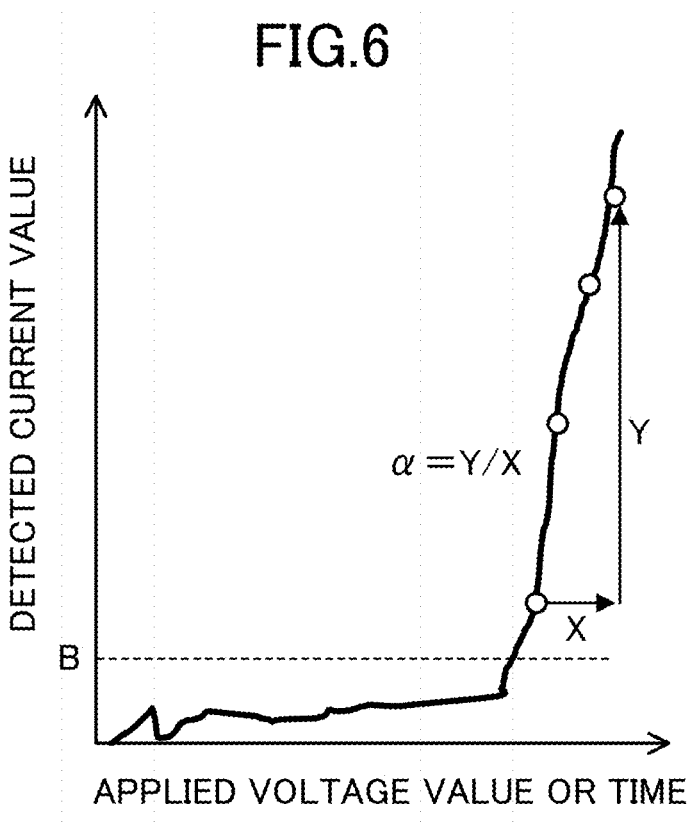
FIG. 6 is a diagram for explaining an example of a method for calculating a rising gradient.
Figure 7:
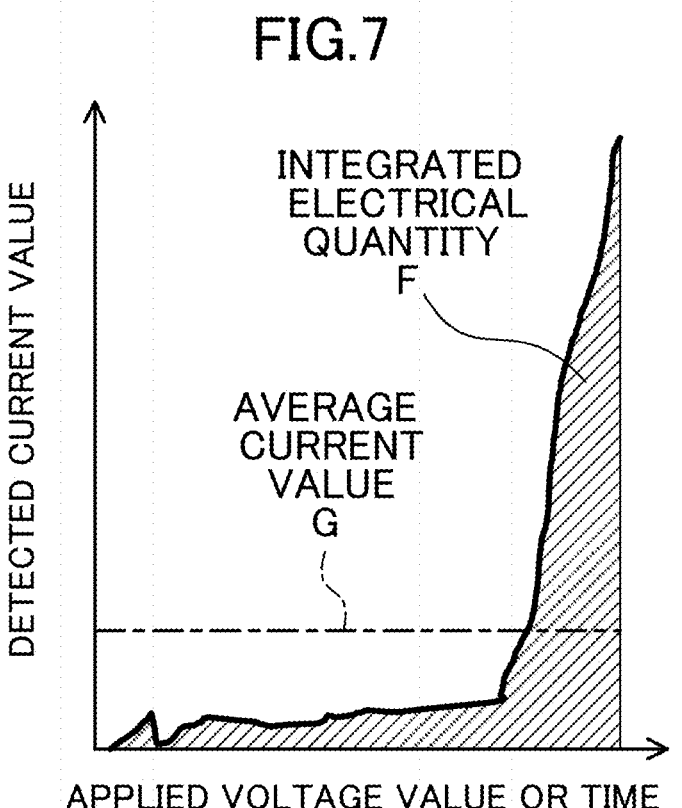
FIG. 7 is a diagram for explaining an example of a method for calculating an integrated electrical quantity and a time average value thereof.

FIG. 2 is a flowchart illustrating a process of a corrosion-resistance testing method according to this embodiment. FIG. 3 illustrates an example of a change in an applied voltage (single-dotted chain line) and a change in a current (solid line) flowing between the electrode and the steel plate in accordance with voltage application when a corrosion resistance test is performed on a coated metal member having a normal electrodeposition coating. FIG. 4 is a diagram for explaining an example of a conduction mechanism in the coated metal member having the normal electrodeposition coating. FIG. 5 is a diagram for explaining the concept of the corrosion-resistance testing method according to this embodiment. FIG. 6 is a diagram for explaining an example of a method for calculating a rising gradient. FIG. 7 is a diagram for explaining an example of a method for calculating an integrated electrical quantity and a time average value thereof. The corrosion-resistance testing method according to this embodiment will be described below with reference to FIGS. 2 to 7.

As shown in FIG. 2, the corrosion-resistance testing method according to this embodiment includes a preparation step S1, an electrification step S2, and an evaluation step S3.

Preparation Step

The preparation step S1 involves disposing the corrosion factor 6 that comes into contact with the surface of the electrodeposition coating 4 and the electrode 12 that comes into contact with the corrosion factor 6 at the electrodeposition coating 4 side of the coated metal member 1.

In detail, for example, the container 30 is first set on the surface of the electrodeposition coating 4 in a test piece of the coated metal member 1 with the sealing member 32 interposed therebetween, and the corrosion factor 6 is injected into the container 30. Then, the corrosion factor 6 is brought into contact with the surface of the electrodeposition coating 4. Moreover, the electrode 12 connected to the external circuit 7 is immersed in the corrosion factor 6.

Electrification Step

The electrification step S2 involves applying a voltage and/or a current between the electrode 12 and the steel plate 2 and measuring a temporal change in a current and/or a voltage occurring between the electrode 12 and the steel plate 2.

In detail, for example, the electrifier 8 applies a voltage and/or a current between the electrode 12 and the steel plate 2 under the control of the controller 9. In this case, it is desirable that the voltage and/or the current to be applied gradually increase/increases relative to time. Preferably, the voltage and/or the current gradually increase/increases proportionally relative to time. Accordingly, a defect occurrence status of the electrodeposition coating 4 can be evaluated accurately within a shorter period of time. If a voltage is to be applied, for example, the sweep rate of the applied voltage specifically ranges between 0.1 V/s and 10 V/s and more preferably ranges between 0.5 V/s and 2 V/s. If a current is to be applied, for example, the sweep rate of the applied current specifically ranges between 0.1 mA/s and 2 mA/s and more preferably ranges between 0.5 mA/s and 1 mA/s. The voltage and/or the current to be applied may be direct current (DC) or alternating current (AC).

Then, the electrifier 8 detects a current and/or a voltage occurring between the steel plate 2 and the surface of the electrodeposition coating 4 in accordance with the application of the voltage and/or the current. The detected current value and/or the detected voltage value are/is stored as temporal change data in the storage unit 92.

A threshold value may be provided for at least one of the applied voltage value and/or the applied current value and the detected current value and/or the detected voltage value. When the threshold value is reached, the applied voltage value and/or the applied current value may be fixed, or the electrification step may be terminated. Accordingly, application of an excessive voltage and/or current can be suppressed, and the measurement accuracy can be ensured.

Evaluation Step

The evaluation step S3 involves evaluating the coating quality of the electrodeposition coating 4 based on the temporal change data of the detected current value and/or the detected voltage value obtained in the electrification step S2.

In detail, the coating quality of the electrodeposition coating 4 is evaluated based on at least one of a "rising gradient" serving as a gradient of the temporal change when the detected current value and/or the detected voltage value exceed/exceeds the predetermined value in the temporal change data, an "integrated electrical quantity" serving as an integrated value of the detected current value and/or the detected voltage value within the predetermined time range, and an "average current value and/or average voltage value per unit time" serving as a time average value of the integrated electrical quantity. The correspondence relationship between the aforementioned parameters of the temporal change data and the coating quality of the electrodeposition coating 4 will be described below with reference to an example where a voltage is to be applied and a current is to be detected.

As shown in FIG. 3, in a case where the electrodeposition coating 4 is a normal coating, that is, in a case where the overall coating quality of the electrodeposition coating 4 is normal, for example, when a direct-current voltage (i.e., the single-dotted chain line in FIG. 3) that gradually increases proportionally is applied between the electrode 12 and the steel plate 2, the temporal change data of the current value flowing between the electrode 12 and the steel plate 2 has the waveform indicated by the solid line in FIG. 3. Specifically, even when the applied voltage value is increased, a current hardly flows until the voltage reaches a voltage value $V_1$ at a time point $t_1$. The amount of current increases rapidly when the voltage exceeds the voltage value $V_1$. The amount of current reaches a threshold value $A_1$ at a voltage value $V_2$ (time point $t_2$). This temporal change in the current value indicates that the blocking performance of the electrodeposition coating 4 against the corrosion factor 6 is maintained until the voltage value $V_1$ is reached. When the voltage value $V_2$ is reached, the voltage application accelerates the penetration of the corrosion factor 6 into the electrodeposition coating 4, as shown in FIG. 4. This indicates that the corrosion factor 6 has reached the surface of the steel plate 2 via the most fragile location of the electrodeposition coating 4, that is, for example, a location having a relatively small amount of the crosslinked structure of the resin. In other words, the rapid increase in the detected current value in FIG. 3 indicates that the insulation property, that is, the blocking performance, of the electrodeposition coating 4 is lost due to the corrosion factor 6 reaching the surface of the steel plate 2. Assuming that the applied voltage value $V_2$ when the detected current value reaches the threshold value $A_1$ is defined as an insulation voltage, the time point $t_2$ at which the insulation voltage $V_2$ is reached corresponds to a time period for the corrosion factor 6 to reach the steel plate 2, that is, a corrosion suppression period of the coated metal member 1.

On the other hand, if the overall coating quality of the electrodeposition coating 4 is not normal due to, for example, a decrease in crosslink density caused by insufficient baking, degradation of the coating material and the coating, or a defective deposition of a coating component, it is predicted that the waveform of the temporal change in the detected current value may differ from the waveform shown in FIG. 3.

In detail, if the overall coating quality of the electrodeposition coating 4 is not normal, it is conceivable that the waveform of the temporal change data obtained in the electrification step S2 is, for example, as shown in FIG. 5. Specifically, as shown in the left-end cell in FIG. 5, it is conceivable that the penetration of the corrosion factor 6 into the electrodeposition coating 4 is accelerated uniformly over a wide range in accordance with the voltage application, and that conduction occurs gradually from where the corrosion factor 6 has reached the steel plate 2. Thus, it is conceivable that the gradient along which the detected current value and/or the detected voltage value increase/increases changes from a steep gradient, as in FIG. 3, to a gentle gradient.

As shown in parts (1) and (2) in FIG. 5, when a gradually-increasing voltage (DC) or a constant voltage (DC) is applied, it is conceivable that the detected current value starts to increase when the voltage exceeds a certain voltage value (time), and subsequently increases gently. In the case of part (2), the rate of increase of the detected current value is conceivably lower than that in part (1). Furthermore, as shown in parts (3) and (4) in FIG. 5, when a gradually-increasing voltage (AC) or a constant voltage (AC) is applied, it is conceivable that the amplitude of the detected current value starts to increase when the voltage exceeds a certain voltage value (time), and subsequently increases gently. In the case of part (4), the rate of increase of the amplitude of the detected current value is conceivably lower than that in part (3).

With regard to such temporal change data, it is conceivable that an evaluation is performed by using evaluation parameters as shown in, for example, FIGS. 6 and 7.

Specifically, it is conceivable that a rising gradient $\alpha$ when the detected current value of the temporal change data shown in FIG. 6 starts to increase is large for a normal coating, and decreases as the coating quality of the electrodeposition coating 4 deteriorates. Therefore, the rising gradient $\alpha$ can be used as an evaluation parameter. The rising gradient $\alpha$ may be expressed as, for example, a rate of increase ($\alpha=Y/X$) obtained as a result of dividing an increment Y of the detected current value from a measurement point immediately after the detected current value exceeds a predetermined value B to a measurement point immediately before the applied voltage value or the detected current value reaches a threshold value set as an upper limit value of measurement by an increment X of the applied voltage value or time. Furthermore, the gradient $\alpha$ may be expressed as a rate of increase ($\alpha=Y/X$) obtained as a result of dividing the increment Y of the detected current value from the measurement point immediately after the detected current value exceeds the predetermined value B to a measurement point after a lapse of a fixed time period by the increment X of the applied voltage value or time. The predetermined value B is appropriately set in accordance with, for example, the test conditions and the coating quality of the electrodeposition coating 4, and may specifically be set between, for example, 0.1 mA and 1 mA inclusive. The fixed time period that defines X and Y may also be appropriately set in accordance with, for example, the test conditions and the coating quality of the electrodeposition coating 4, and may specifically be set between, for example, 1 second and 5 seconds inclusive.

Furthermore, since it is conceivable that an integrated electrical quantity F serving as an integrated value within the predetermined time range of the detected current value of the temporal change data shown in FIG. 7 decreases for a normal coating and increases as the coating quality of the electrodeposition coating 4 deteriorates, the integrated electrical quantity F can be used as an evaluation parameter. For example, the predetermined time range can be set to, but not limited to, a time period from when the voltage application starts to when the applied voltage value or the detected current value reaches a predetermined threshold value. If the abscissa axis of the temporal change data indicates the applied voltage value, the integrated electrical quantity F is calculated in view of the increasing rate.

Moreover, with regard to the integrated electrical quantity F, it is more preferable that an average current value G serving as a time average value of the integrated electrical quantity F be used an evaluation parameter in view of the fact that the predetermined time range may vary for each test piece of the object to be tested. In detail, assuming that the predetermined time range used for calculating the integrated electrical quantity F is defined as T, the average current value G can be obtained by dividing the integrated electrical quantity F by a predetermined time range T ($G=F/T$). Because the integrated electrical quantity F is a numerical value converted per unit time, the average current value G further contributes to improved accuracy for evaluating the coating quality.

Furthermore, when a threshold value $G_1$ is set for the average current value G and the average current value G exceeds the threshold value $G_1$, it may be determined that the coating quality is not normal. If the coating quality is not normal, the detected current value gradually increases, so that it is conceivable that the average current value G may increase, as compared with the case where the coating quality is normal. Thus, when the average current value G exceeds the threshold value $G_1$, it can be determined immediately that the coating quality is not normal, whereby an abnormality in the coating quality can be detected readily and accurately.

As described above, in the corrosion-resistance testing method according to this embodiment, the overall coating quality of the electrodeposition coating 4 can be evaluated readily and accurately based on at least one of the evaluation parameters including the rising gradient $\alpha$, the integrated electrical quantity F, and the average current value G in the temporal change data. Although the above description relates to an example where a voltage is to be applied and a current is to be detected, a similar concept is possible in a case where a current is to be applied and a voltage is to be detected. In this case, the evaluation parameter corresponding to the average current value G may be referred to as an average voltage value.

Normally, the corrosion suppression period of the electrodeposition coating 4 is expressed as a product of the coating thickness and the coating quality ((corrosion suppression period)=(coating thickness)×(coating quality)). Thus, in the related art, information about the coating thickness and the corrosion suppression period is required for evaluating the coating quality of the electrodeposition coating 4.

In this regard, in the corrosion-resistance testing method according to this embodiment, the coating quality can be evaluated readily and accurately even when the information about the coating thickness and/or the corrosion suppression period is not obtained. Thus, for example, even for a test piece whose coating thickness is difficult to measure, specifically, for example, an object with a curved surface or a complex shape whose coating thickness is difficult to measure, such as an edge of a component, a welded bead, or other components, the coating quality can be evaluated readily and accurately. Moreover, the reliability of the corrosion resistance test is enhanced. Furthermore, with the present disclosure, corrosion-resistance-related information about the electrodeposition coating 4 in the coated metal member 1 can quantitatively serve as digital data. If the coated metal member 1 has an electrodeposition coating 4 with an abnormal coating quality, for example, the time period up until the aforementioned predetermined value B or another predetermined value is exceeded may be considered as the corrosion suppression period.

Furthermore, it is conceivable that the rising gradient α, the integrated electrical quantity F, and the average current value G and/or the average voltage value also have a correlation with the degree of cure of the electrodeposition coating 4. In detail, for example, the rising gradient α decreases with deteriorating coating quality, that is, decreasing degree of cure. The integrated electrical quantity F and the average current value G and/or the average voltage value increase with deteriorating coating quality, that is, decreasing degree of cure. Thus, for example, it is conceivable that there is a proportional correlation between these evaluation parameters and the degree of cure. The degree of cure can be calculated as the coating quality of the electrodeposition coating 4 based on the correlation.

For analyzing the waveform of the temporal change data, an image processing technique, such as machine learning, or a mathematical technique, such as differentiation, may be used. Alternatively, these techniques may be used in combination with each other.

Based on the analytical result of the waveform of the temporal change data, it is possible to predict a problem in the electrodeposition coating 4 of the coated metal member 1, estimate the cause thereof, and perform process management thereon.

In detail, for example, the waveform of the temporal change data may be analyzed by periodically extracting a component from a manufacturing line, or the waveform of the temporal change data in a commercially-available product may be periodically analyzed, so that the coating quality of the electrodeposition coating 4 in the coated metal member 1 can be monitored. This can contribute to, for example, confirmation of the quality of the electrodeposition coating 4, prediction of deterioration in the quality thereof, and confirmation of an effect of the market environment on the electrodeposition coating 4.

Furthermore, for example, the manufacturing process of the coated metal member 1 is mainly divided into four processes, namely, a shaping-machining process of the steel plate 2, a degreasing process, a chemical conversion process, and an electrodeposition coating process. In the shaping-machining process of the steel plate 2, for example, a deposition abnormality may occur in the coating component due to a change in the surface of the steel plate 2 caused by welding heat, possibly leading to lower corrosion resistance of the electrodeposition coating 4. In the degreasing process, when repellence occurs depending on the degree of residual oil, a deposition abnormality may possibly occur in the coating component. A chemical conversion defect in the chemical conversion process may also cause a deposition abnormality in the coating component. In the electrodeposition coating process, a deposition abnormality in the coating component may be caused by coating conditions, such as the mixture ratio between a resin component and a pigment component and a deviation in the coating material balance with respect to the conductivity of the coating material. Thus, for example, by combining the analysis of the waveform of the temporal change data preferably with a result of surface observation, the process that contributes to deterioration in the coating quality can be identified.

Furthermore, at the manufacturing site of the coated metal member 1, temporal change data in the same manufacturing line, temporal change data at the same factory, temporal change data at another factory, and temporal change data at a factory of another manufacturer may be stored in a database, so that the coating quality of the electrodeposition coating 4 can be evaluated more accurately based on a comparison among these pieces of data.

By identifying the affecting process and analyzing differences in performance between the factories, the quality of the electrodeposition coating 4 can be ensured and the cause of deterioration in the quality of the electrodeposition coating 4 can be estimated. Moreover, based on a linkage with production management conditions, quality process management can be realized with respect to an anti-corrosion range. Furthermore, by combining this evaluation technique with another analysis technique, the coating composition, the anti-corrosion function, and the development process thereof can be managed in an integrated fashion.

TEST EXAMPLES

The following description relates to examples of tests performed for indicating specific examples of the temporal change data.

Corrosion Resistance Test

First, a test piece (also referred to as "TP" hereinafter) to be used in each of corrosion resistance tests according to test examples 1 to 7 is fabricated.

Figure 10:
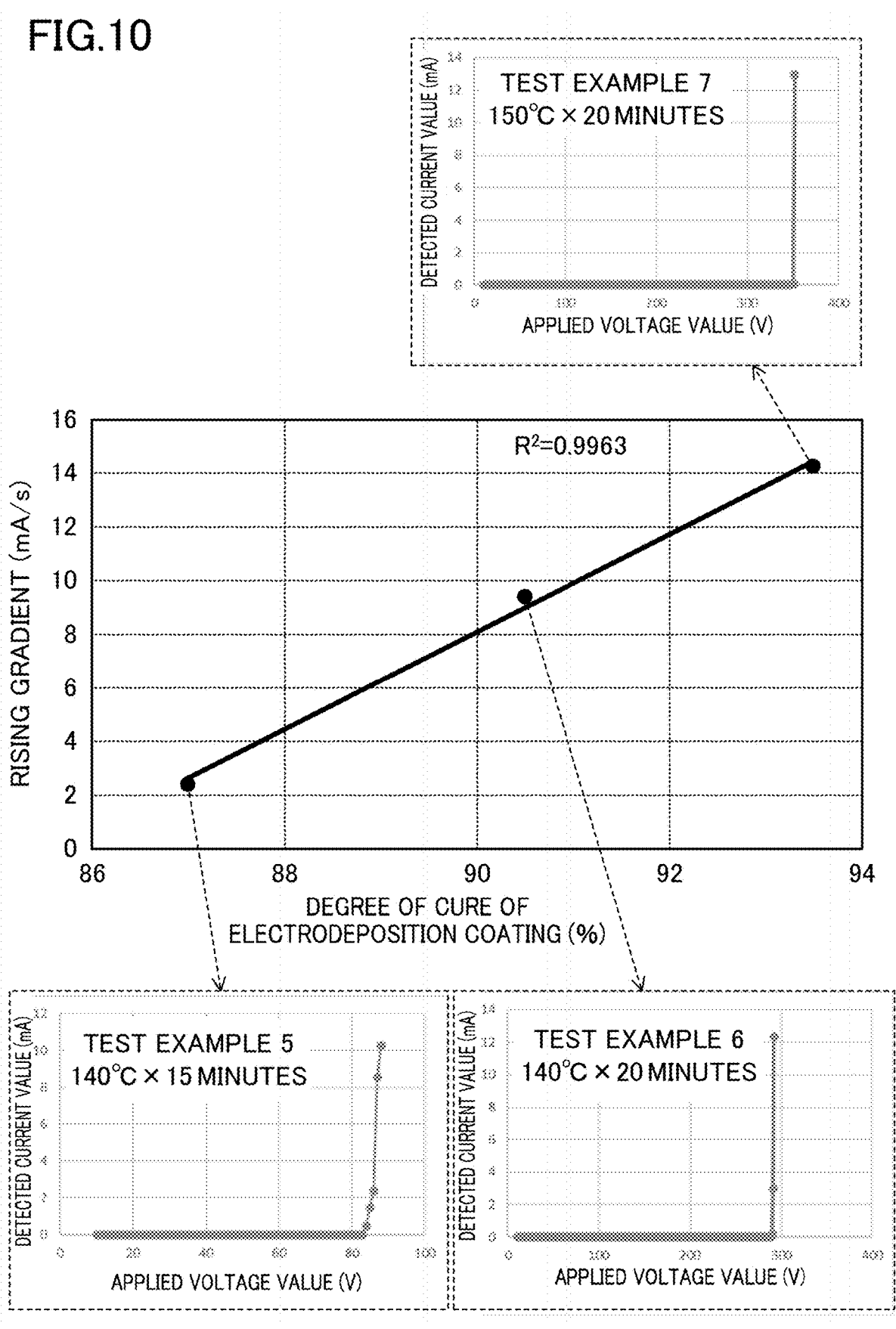
FIG. 10 is a graph illustrating results of corrosion resistance tests according to test examples.
Figure 11:
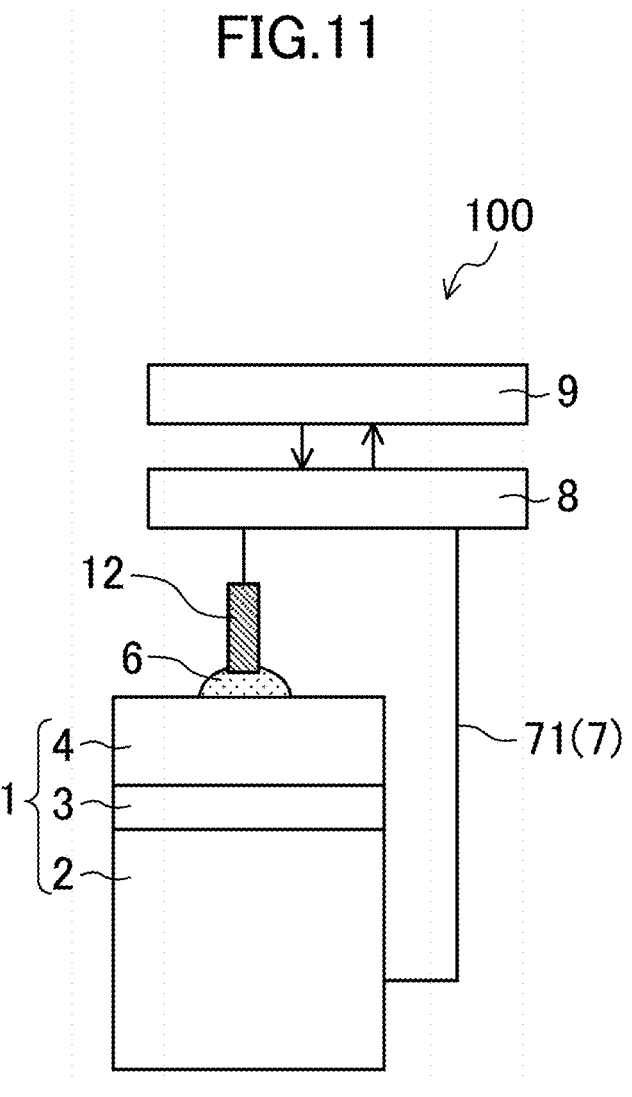
FIG. 11 illustrates an example of a corrosion-resistance testing apparatus for a coated metal member according to a second embodiment.

The specifications of the coated metal member 1 are as follows. Specifically, the metallic substrate used is obtained by forming a zinc phosphate coating serving as the chemical conversion coating 3 on the surface of a GA serving as the steel plate 2. The time used for the chemical conversion process for forming the zinc phosphate coating is 120 seconds. The electrodeposition coating 4 composed of epoxy-based resin is formed as the surface treatment coating. The electrodeposition baking conditions for the TP in each of test examples 1 to 4 and the thickness of the electrodeposition coating 4 are as shown in FIGS. 8 and 9. The electrodeposition baking conditions for the TP in each of test examples 5 and 6 are as shown in FIG. 10, and the thickness of the electrodeposition coating 4 is 10 μm.

The corrosion factor 6 used is a 5%-by-mass sodium chloride solution, and a voltage is applied thereto at a temperature of 25° C. while increasing the voltage at 1 V/s until the detected current value reaches a threshold current value of 10 mA. A current value occurring between the electrode 12 and the steel plate 2 is detected every second.

Test Examples 1 to 4

FIGS. 8 and 9 illustrate temporal change data in which the detected current value is plotted out relative to the applied voltage value in the TP according to each of test examples 1 to 4, as well as digital microscope photographs of the surface after a combined cyclic test (CCT) or a 5%-by-mass salt-water immersion test is performed on the TP.

As the test conditions for the CCT, a salt-water spraying step (6 hours), a drying step (3 hours), a wetting step (14 hours), and an air blowing step (1 hour) are performed on the TP for a predetermined time period at 24 hours per cycle.

With regard to the TP in each of the first to fourth text examples, the rising gradient $\alpha$ (mA/s) when the detected voltage value exceeds the predetermined value B of 0.5 mA is calculated based on the temporal change data in view of the fact that the increasing rate of the applied voltage is 0.1 V/s. Specifically, the gradient $\alpha$ is calculated by dividing the increment Y of the detected current value from the measurement point immediately after the detected current value exceeds 0.5 mA to the measurement point immediately before the detected current value reaches the threshold value of 10 mA set as an upper limit value of measurement by the increment X of time. Furthermore, the integrated electrical quantity F (mC) and the average current value G (mA) of the integrated electrical quantity F per unit time are calculated assuming that the predetermined time range is set to a time period from when the voltage application starts to when the detected current value reaches the threshold current value of 10 mA.

As shown in FIG. 8, in the TP having the normal electrodeposition coating 4 according to test example 1, the waveform of the temporal change data has a pattern indicating a rapid increase in the current value at a time point when the applied voltage value exceeds 250 V. Then, when the TP according to test example 1 undergoes the CCT, no corrosion is observed in the electrodeposition coating 4 after 30 days.

The TP according to test example 2 has a so-called insufficiently-baked electrodeposition coating 4 in which cross-links are not sufficiently formed due to insufficient baking. The waveform of the temporal change data is such that the rising gradient of the detected current value is gentle, as compared with the waveform of the temporal change data in test example 1. Specifically, the rising gradient is smaller in test example 2 than in test example 1, and the integrated electrical quantity and the average current value per unit time have increased by about 1.4 times and about 4.3 times, respectively. When the TP according to test example 2 undergoes the CCT (60 days), a corrosion progression is observed over the entire surface of the TP. In contrast, in a TP having a normal coating, no corrosion is observed after the CCT (60 days).

In the TP according to test example 3 shown in FIG. 9, the electrodeposition coating 4 is formed by using a coating material in which the resin in the coating component is photo-deteriorated. The rising gradient in the temporal change data is smaller than that in test example 1, and the integrated electrical quantity and the average current value per unit time have increased by about 3.7 times and about 32 times, respectively, as compared with test example 1. When the TP according to test example 3 undergoes the CCT (10 days), a corrosion progression is observed over the entire surface of the TP. In contrast, in a TP having a normal coating, no corrosion is observed after the CCT (10 days).

In the TP according to test example 4, a deposition abnormality has occurred in the pigment included in the coating material. The rising gradient in the temporal change data is smaller than that in test example 1, and the integrated electrical quantity and the average current value per unit time have increased by about 2.9 times and about 6.1 times, respectively, as compared with test example 1. When the TP according to test example 4 is immersed in 5%-by-mass salt water for 20 days, a corrosion progression is observed over the entire surface of the TP. In contrast, in a TP having a normal coating, no corrosion is observed after exposing the TP to a similar environment.

Test Examples 5 to 7

FIG. 10 illustrates temporal change data in which the detected current value is plotted out relative to the applied voltage value in the TP according to each of test examples 5 to 7, as well as the relationship between the rising gradient $\alpha$ calculated from the temporal change data and the degree of cure of the electrodeposition coating. The rising gradient $\alpha$ of the TP in each of test examples 5 to 7 is calculated using the same method as that used in test examples 1 to 4. Furthermore, by cleaning the TP with acetone and eluting uncured resin from the electrodeposition coating 4, the degree (%) of cure thereof is calculated from a change in the weight of the electrodeposition coating 4 before and after the elution.

As shown in FIG. 10, the rising gradient of the temporal change data decreases with decreasing degree of cure of the electrodeposition coating. Thus, it is confirmed that there is a proportional correlation between the degree of cure of the electrodeposition coating and the rising gradient.

Corrosion-Resistance Testing Program and Storage Medium

At least one or more of the steps included in the above corrosion-resistance testing method are programmed as a corrosion-resistance testing program. In detail, the corrosion-resistance testing program according to this embodiment causes a computer to execute at least the evaluation step S3, preferably, the electrification step S2 and the evaluation step S3, of the above-described steps. The corrosion-resistance testing program may be executed by the control unit 91 and the arithmetic unit 93 while being stored in the storage unit 92. Furthermore, as an alternative to being stored in the storage unit 92, the corrosion-resistance testing program may be stored in any of various known computer-readable storage media, such as an optical disk medium or a magnetic tape medium. The corrosion-resistance testing program may be read by attaching such a storage medium to a reader (not shown) of the controller 9, whereby the program is executable.

Second Embodiment

A second embodiment according to the present disclosure will be described in detail below. In the description of this embodiment, sections identical to those in the first embodiment will be given the same reference signs, and detailed descriptions thereof will be omitted.

As an alternative to the corrosion-resistance testing apparatus 100 according to the first embodiment in which the corrosion factor 6 is contained in the container 30, for example, the electrode 12 used may be of a probe type, as shown in FIG. 12.

In this embodiment, the preparation step S1 involves disposing the corrosion factor 6 on the surface of the electrodeposition coating 4. If the corrosion factor 6 is mud-like or is a material with high viscosity, the corrosion factor 6 may be disposed directly on the electrodeposition coating 4. If the corrosion factor 6 is composed of a material with low viscosity, such as an aqueous solution, a porous material, such as a sponge, may be soaked with the corrosion factor 6 and be disposed on the surface of the electrodeposition coating 4. Then, the end of the electrode 12 is brought into contact with the corrosion factor 6 disposed on the surface of the electrodeposition coating 4. In this case, in a state where the corrosion factor 6 is adhered to the end of the electrode 12, the end is preferably brought into contact with the corrosion factor 6. With the corrosion factor 6 being adhered to the end of the electrode 12, contact resistance at the interfaces among the electrode 12, the corrosion factor 6, and the surface of the electrodeposition coating 4 can be reduced.

According to the above-described configuration, the test piece is not limited in shape, thereby facilitating the measurement with respect to, for example, a test piece not having a flat surface, an edge of a test piece, and a curved section of a test piece.

The present disclosure is extremely advantageous in being able to provide a corrosion-resistance testing method for a coated metal member, a corrosion-resistance testing apparatus for a coated metal member, a corrosion-resistance testing program for a coated metal member, and a storage medium storing the program by which the state of a surface treatment coating can be evaluated accurately and readily in more detail.

What is claimed is:

1. A corrosion-resistance testing method for a coated metal member formed of a metallic substrate provided with a surface treatment coating, the corrosion-resistance testing method comprising:

an electrification step for applying a voltage between a surface of the surface treatment coating and the metallic substrate in a state where a corrosion factor is in contact with the surface of the surface treatment coating so as to measure a temporal change in a current occurring between the surface of the surface treatment coating and the metallic substrate; and an evaluation step for evaluating a coating quality of the surface treatment coating based on a gradient of the temporal change when a value of the current exceeds a predetermined value, wherein the gradient is expressed as a rate of increase obtained as a result of dividing an increment of the value of the current from a measurement point immediately after the value of the current exceeds the predetermined value to a measurement point immediately before the value of the current reaches a threshold value set as an upper limit value of measurement by an increment of time.

2. The corrosion-resistance testing method for the coated metal member according to claim 1, wherein the electrification step includes applying the voltage gradually increasing relative to time or gradually increasing proportionally relative to time.

3. The corrosion-resistance testing method for the coated metal member according to claim 1, wherein the metallic substrate includes a chemical conversion coating formed on a surface of the metallic substrate, and wherein the surface treatment coating is provided on the surface of the metallic substrate with the chemical conversion coating interposed therebetween.

4. The corrosion-resistance testing method for the coated metal member according to claim 1, wherein the metallic substrate is a steel plate for an automotive component.

5. The corrosion-resistance testing method for the coated metal member according to claim 1, wherein the surface treatment coating is an electrodeposition coating formed by using a resin-based coating material.

6. The corrosion-resistance testing method for the coated metal member according to claim 1, wherein the predetermined value ranges between 0.1 mA and 1 mA inclusive.

7. A corrosion-resistance testing apparatus for a coated metal member formed of a metallic substrate provided with a surface treatment coating, the corrosion-resistance testing apparatus comprising:

an electrode disposed at the surface treatment coating side of the coated metal member;

a power supply configured to apply a voltage between the electrode and the metallic substrate in a state where a corrosion factor is disposed between the surface treatment coating and the electrode and in contact with the surface treatment coating and the electrode;

a detector configured to detect a current occurring between the electrode and the metallic substrate in accordance with the voltage applied by the power supply; and a controller configured to evaluate a coating quality of the surface treatment coating based on a gradient of a temporal change in the current detected by the detector when a value of the current exceeds a predetermined value, wherein the gradient is expressed as a rate of increase obtained as a result of dividing an increment of the value of the current from a measurement point immediately after the value of the current exceeds the predetermined value to a measurement point immediately before the value of the current reaches a threshold value set as an upper limit value of measurement by an increment of time.

8. The corrosion-resistance testing apparatus for the coated metal member according to claim 7, wherein the power supply is configured to apply the voltage gradually increasing relative to time or gradually increasing proportionally relative to time.

9. The corrosion-resistance testing apparatus for the coated metal member according to claim 7, wherein the predetermined value ranges between 0.1 mA and 1 mA inclusive.

10. A corrosion-resistance testing program stored in a computer-readable storage medium for a coated metal member formed of a metallic substrate provided with a surface treatment coating, the corrosion-resistance testing program causing a computer to execute a process comprising:

evaluating a coating quality of the surface treatment coating based on a gradient of a temporal change in a current when a value of the current exceeds a predetermined value, the current occurring between a surface of the surface treatment coating and the metallic substrate as a result of applying a voltage between the surface of the surface treatment coating and the metallic substrate in a state where a corrosion factor is in contact with the surface of the surface treatment coating, wherein the gradient is expressed as a rate of increase obtained as a result of dividing an increment of the value of the current from a measurement point immediately after the value of the current exceeds the predetermined value to a measurement point immediately before the value of the current reaches a threshold value set as an upper limit value of measurement by an increment of time.

* * * * *